United States Patent [19]

Lee

[11] Patent Number: 5,220,664
[45] Date of Patent: Jun. 15, 1993

[54] MERGING NETWORK WITH THREE OR MORE SIMULTANEOUS INPUTS

[75] Inventor: Tony T. Lee, Bridgewater, N.J.

[73] Assignee: Bell Communications Research, Inc., Livingston, N.J.

[21] Appl. No.: 736,469

[22] Filed: Jul. 26, 1991

[51] Int. Cl.$^5$ .............................................. G06F 7/36
[52] U.S. Cl. ..................... 395/600; 340/146.2; 364/DIG. 2; 364/962.2; 364/962.3; 364/948.3
[58] Field of Search ............... 395/604, 650, 700, 800; 340/146.2

[56] References Cited

U.S. PATENT DOCUMENTS

| | | | |
|---|---|---|---|
| 4,410,960 | 10/1983 | Kasuya | 364/900 |
| 4,567,572 | 1/1986 | Morris et al. | 364/900 |
| 4,628,483 | 12/1986 | Nelson | 364/900 |
| 4,651,301 | 3/1987 | Ballmer et al. | 364/900 |
| 4,799,152 | 1/1989 | Chuang et al. | 364/200 |

OTHER PUBLICATIONS

Bather K. E. "Sorting Networks and their Applications" AFIPS Spring Joint Computer Conference Proceedings, 1968, pp. 307-314.
"The Art of Computer Programming", D. E. Knuth, vol. 3, Addison Wesley, Reading, Mass. 1973.
"An O (nlogn) Sorting Network", M. Ajtai et al., Proc. 15th Annual ACM Symposium on Theory of Computing, 1983, pp. 1-9.
"Sorting Networks and Their Applications", K. E. Batcher, AFIPS Proceeding of the Spring Joint Computer Conference, 1960, pp. 307-318.
"Tight Bounds on the Complexity of Parallel Sorting", F. T. Leighton, IEEE Trans. on Computer, vol. 34, No. 4, 1985, pp. 344-354.

Primary Examiner—Thomas C. Lee
Assistant Examiner—Peter Y. Wang
Attorney, Agent, or Firm—Leonard Charles Suchyta; James W. Falk

[57] ABSTRACT

A merging network which receives three or more simultaneous input lists of sorted numbers and merges the input lists to form a single sorted list at its outputs. The merging network comprises three stages of interconnected comparator modules, the merging network inputs being connected to the inputs of the comparator modules of the first stage with a mod shuffle interconnection pattern. The outputs of the third stage form the network outputs of the merging network. The first, second, and third stages include one or more comparator modules which are larger than two-by-two. The inventive merging network may be utilized recursively to form a sorting network.

10 Claims, 3 Drawing Sheets

MERGING NETWORK WITH THREE OR MORE SIMULTANEOUS INPUTS

FIELD OF THE INVENTION

The present invention relates to a merging network. More specifically, the present invention relates to a merging network which receives more than two ordered lists of numbers at its inputs and merges these lists to form a single ordered list at its outputs. The inventive merging network may be utilized recursively to form a sorting network for sorting a list of numbers. This sorting network has significant advantages in comparison to a conventional binary sorting network.

BACKGROUND OF THE INVENTION

Sorting is a fundamental process in many computer and communication systems. For example, sorting plays an important role in parallel computing and also in packet switching. In the case of packet switching, it is known that a packet switch based on an interconnection network such as a banyan network is internally non-blocking, if the packets inputted to the banyan network are sorted according to their destination addresses. Thus, an internally non-blocking packet switch may be formed by connecting a sorting network and a banyan network in sequence. In addition, sorters play an important role in the areas of relational databases. For example, sorters may be utilized to perform relational database operations such as join operations in a distributed computer system.

Many sorting networks and algorithms have been proposed. (See e.g., D. E. Knuth, "The Art of Computer Programming", Vol. 3, Addison Wesley, Reading, Mass., 1973). Recently, a network with a size on the order of nlogn for sorting n numbers has been discovered. (See e.g. M. Ajtai et al, "An O(nlogn) Sorting Network" Proc. $15^{th}$ Annual ACM Symposium on Theory of Computing, 1983, pp. 1-9). Although this network is asymptotically optimal, it performs poorly for practical values of n.

Merging is a process of arranging m ordered lists of numbers into one ordered list. In his pioneer paper, "Sorting Networks and Their Applications" AFIPS Proceeding of the Spring Joint Computer Conference, 1960, pp. 307-318, K. E. Batcher proposed two binary merging networks. A binary merging network receives two ordered lists at its inputs and merges these lists to form a single ordered list at its outputs. A plurality of binary merging networks may be utilized recursively to form a sorting network. A recursive sorting network for sorting $2^n$ input numbers into an ordered list comprises n stages. The first stage comprises $2^{n-1}$ two-by-two merging networks, each of which orders a pair of adjacent input numbers. Thus, the output of the first stage is $2^{n-1}$ ordered lists of two numbers each. The second stage comprises $2^{n-2}$ four-by-four merging networks, each of which merges two of the ordered lists outputted by the first stage. Thus, the second stage outputs $2^{n-2}$ ordered lists, each of which comprises four numbers. The third stage comprises $2^{n-3}$ eight-by-eight merging networks, each of which merges two of the four-number lists outputted by the second stage. This structure continues until in the last stage there is only one merging network which outputs a single ordered list comprising all of the input numbers.

The binary merging networks which are utilized in the above-described sorting network are themselves formed from 2×2 comparator modules which are organized into stages. In particular, an nxn binary merging network comprise $log_2 n$ stages, each of which comprises n/2 2 × 2 comparator modules.

A binary sorting network of the type described above has a number of disadvantages. Because each merging network utilized in the sorting network can sort at most two ordered lists, a relatively large number of stages and a correspondingly large number of merging networks are required. Furthermore, with each successive stage in the binary sorting network, the merging networks are increasingly larger and comprise increasingly large numbers of two-by-two comparator modules. In addition, the length of the interconnection wires between stages in a binary sorting network grows geometrically as the number of stages increases, although the logic complexity of the 2 ×2 comparator modules remains the same. In fact, the overall latency of a binary sorting network may be dominated more by the propagation delays of interconnection wires than by the processing delays of the two-by-two comparator elements.

A great simplification in sorting networks formed recursively from merging networks would be achieved if merging networks were available which could merge more than two ordered input lists.

The problem of providing a merging network which can merge more than two ordered input lists is well known and is intimately related to the problem of forming a merging network from comparator modules which are larger than 2 × 2. These problems have not been completely solved heretofore.

A partial solution is provided by the ColumnSort network (see, e.g., F. T. Leighton, "Tight Bounds on the Complexity of Parallel Sorting", IEEE Trans. on Computer, Vol. 34, No. 4, 1985, pp. 344-354). The ColumnSort network is based on the transformation of matrices. However, this network cannot be utilized recursively to form a large sorter and is limited by a number of constraints on the dimensions of the matrices involved.

Accordingly, it is an object of the present invention to provide a merging network which merges more than two ordered input lists to form a single ordered output list.

It is a further object of the invention to provide a merging network which is formed by comparator modules which can be larger than two-by-two.

It is also an object of the present invention to provide a merging network which can be utilized recursively to form a large sorting network that has fewer stages and simpler interconnection wiring than the conventional binary sorting network.

SUMMARY OF THE INVENTION

The present invention is a merging network for merging a plurality of sorted input lists into a single sorted output list. In contrast to the prior art binary merging networks, the merging network of the present invention merges more than two input lists.

In an illustrative embodiment, a merging network comprises a set of network inputs for receiving m,m>2, input lists of sorted numbers. The merging network also comprises a set of network outputs for outputting a single list of sorted numbers formed from the m input lists. Located in between the network inputs and the network outputs are first, second, and third stages. Each of these three stages comprises one or more comparator modules which may be larger than two-by-two. Each of these comparator modules receives a set of numbers at its inputs and sorts the numbers into an ordered list which appears at its outputs. The individual comparator modules may themselves be Batcher networks.

In the inventive merging network, the first of the three stages comprises s comparator modules $B_j, j=1,2,\ldots,s$. Each of the comparator modules $B_j$ has one or more inputs and one or more Outputs. The network inputs are connected to the inputs of the comparator modules $B_j$ by a mod(s) shuffle interconnection pattern. The outputs of each of the comparator modules $B_j$ in the first stage are partitioned into intervals, $I_{j,i}$, where $I_{j,i}$ indicates the $i^{th}$ output interval of the comparator module $B_j$. Each interval $I_{i,j}$ includes a subset of the outputs of the corresponding comparator module $B_j$.

The second stage comprises k comparator modules $C_i$, $i=1,2,\ldots,k$. Each of the comparator modules $C_i$ of the second stage has one or more inputs and one or more outputs. The $i^{th}$ interval of outputs, $I_{j,i}$, of each of the comparator modules $B_j$ of the first stage is connected to a subset of the inputs of the comparator module $C_i$ of the second stage.

The third stage comprises a plurality of inputs and a plurality of outputs. Each input of the third stage is directly connected to a corresponding output of one of the comparator modules of the second stage. The outputs of the third stage form the network outputs of the merging network. The third stage comprises k.1 comparator modules $D_i$, $i=1,2,\ldots,k-1$. Each comparator module $D_i$ of the third stage has one or more inputs. Each input of a comparator module $D_i$ is formed by an input to the third stage. Each comparator unit $D_i$ also has one or more outputs. Each output of a comparator unit $D_i$ is formed by one output of the third stage. Each of the inputs of a comparator module $D_i$ in the third stage is connected to an output of the comparator module $C_i$ or $C_{i+1}$ in the second stage. In some embodiments of the inventive merging network, some of the inputs to the third stage are not inputs to one of said comparator modules $D_i$ of the third stage, but rather are connected directly to corresponding ones of the outputs of the third stage.

Algorithms for determining the number and sizes of the comparator modules $B_j$, $C_i$, $D_i$ are discussed below. Algorithms for determining how to partition the outputs of the comparator modules $B_j$ of the first stage into intervals and for determining the subsets of inputs of the third stage, which are inputs to particular comparator modules, $D_i$ modules, are also discussed below.

When a merging network is constructed in this manner, a plurality of three or more ordered input lists may be merged into a single ordered output list. The inventive merging network may be utilized recursively to form a sorter which is much less complex than the conventional binary sorter.

DETAILED DESCRIPTION OF THE INVENTION

Figure 1:
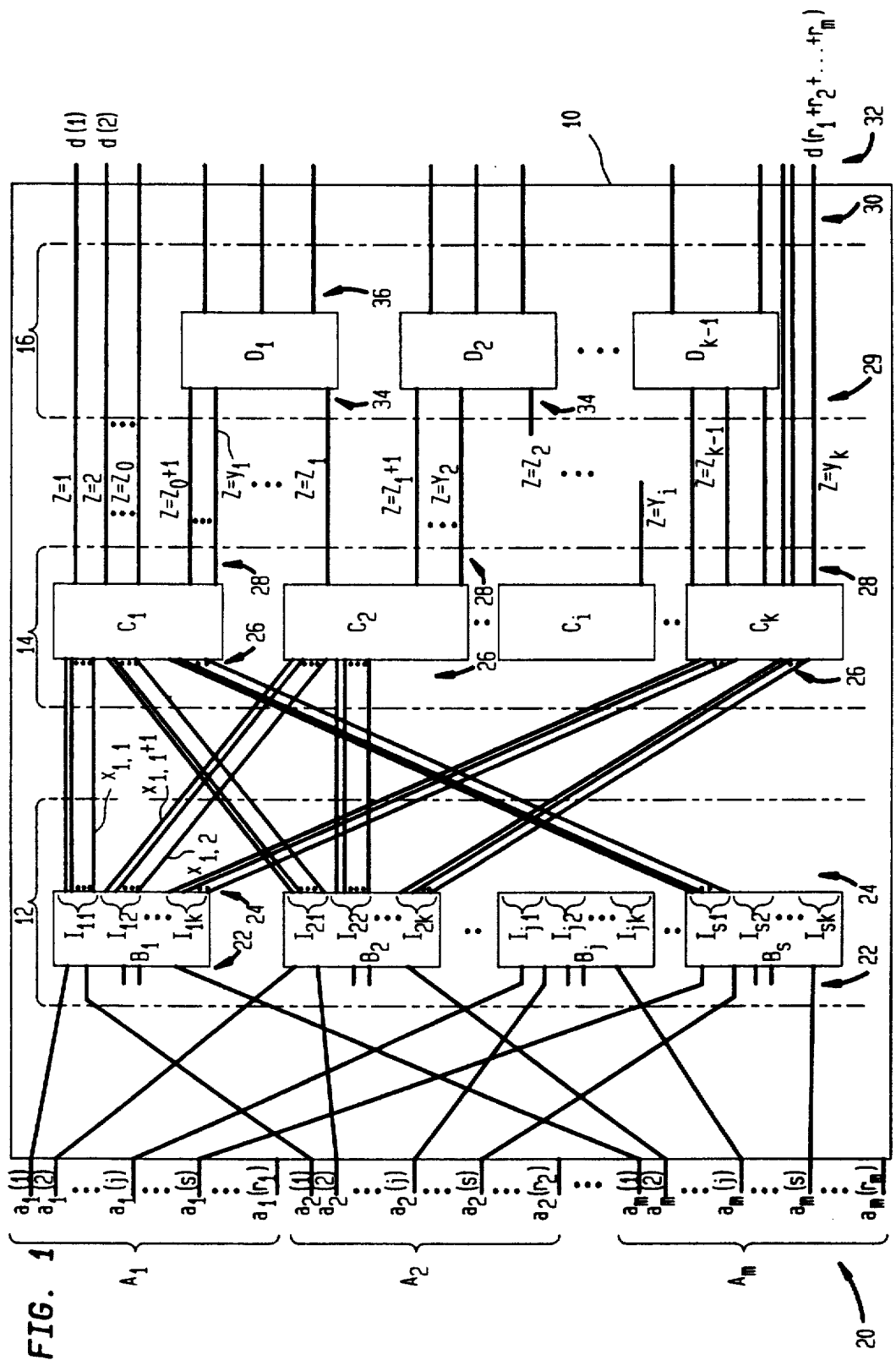
FIG. 1 schematically illustrates a merging network formed from three stages of comparator modules, in accordance with an illustrative embodiment of the present invention.

FIG. 1 illustrates a merging network 10 in accordance with an illustrative embodiment of the present invention.

The network 10 has a plurality of inputs 20. The inputs 20 receive m ordered lists of numbers $$A_1, A_2, \ldots, A_m.$$

The first list A comprises $$\{a_1(1), a_1(2), \ldots, a_1(j), \ldots, a_1(s), \ldots, a_1(r_1)\}.$$

The second list $A_2$ comprises $$\{a_2(1), a_2(2), \ldots, a_2(j), \ldots, a_2(s), \ldots, a_2(r_2)\}.$$

The $m^{th}$ list $A_m$ comprises $$\{a_m(1), a_m(2), \ldots, a_m(j), \ldots, a_m(s), \ldots, a_m(r_m)\}.$$

The total number of network inputs 20 may be expressed as $$r_1 + r_2 + \ldots r_m.$$

The network 10 also comprises the outputs 32. A single ordered list of numbers $d(1), d(2), \ldots$ is formed by the network 10 at the outputs 32. The list of numbers $d(1), d(2), \ldots$ is formed from the numbers contained in the input lists $A_1, A_2, \ldots, A_m$. Preferably the network 10 of FIG. 1 has $r_1 + r_2 + \ldots + r_m$ outputs 32.

The merging network 10 of FIG. 1 comprises three stages 12, 14, and 16. Each of these stages comprises one or more comparator modules. As used herein, the term comparator module refers to a circuit or other data processing unit which receives a group of numbers at its inputs and sorts these numbers into an ordered list which appears at its outputs. The individual comparator modules 12, 14, and 16 may themselves be Batcher networks.

The first stage 12 comprises s comparator modules $B_j$, $j=1,2,\ldots,s$.

The modules $B_j$ of the first stage 12 have the inputs 22. The network inputs 20 and the inputs 22 of the modules $B_j$ are connected using a shuffle interconnection pattern. This means that a number $a_l(k)$ from the list $A_l$ will input to the comparator module $B_j$ if $k=j$ mod(s) for $j=1,\ldots,s-1$ and $k=0$ mod(s) for $j=s$.

Each comparator module $B_j$ of the first stage 12 has a plurality of outputs 24. The outputs 24 of each comparator module $B_j$ are partitioned into i intervals where $i=1,2,\ldots,k$. Each of the intervals is designated $I_{j,i}$, which indicates the $i^{th}$ output interval of the comparator module $B_j$. For example, as shown in FIG. 1, the outputs 24 of comparator module $B_j$ are divided into the intervals $I_{2,1}, I_{2,2}, \ldots, I_{2,k}$. In general, each interval $I_{j,i}$ includes a subset of the outputs of the corresponding comparator module $B_j$. Some of the subsets may be empty.

The second stage 14 of the network 10 comprises k comparator modules $C_i$, $i=1,2,\ldots,k$.

Each of the comparator modules $C_i$ in the stage 14 has a set of inputs 26 and a set of outputs 28. The output interval $I_{j,i}$ associated with the comparator module $B_j$ of stage 12 is connected to a subset of the inputs 26 of the comparator module $C_i$ of stage 14. For example, the outputs in the interval $I_{1,1}$ of the comparator module $B_1$ in the stage 12 are connected to the comparator module $C_1$ in the stage 14, the outputs in the interval $I_{1,2}$ of the comparator module $B_1$ are connected to the comparator module $C_2$, and the outputs in the interval $I_{1,k}$ are connected to the comparator module $C_k$. Similarly, the outputs in the interval $I_{2,1}$ of the comparator module $B_2$ of the stage 12 are connected to the comparator module $C_1$ of the stage 14, the outputs in the interval $I_{2,2}$ are connected to the comparator module $C_2$ and the outputs of the interval $I_{2,k}$ are connected to the comparator module $C_k$.

Each output 24 of a comparator module $B_j$ in the stage 12 is given an index $x_j$, $x_j = 1,2, \ldots$. The number which appears on an output 24 of comparator $B_j$ with index $x_j$ is $b_j(x_j)$. The interval $I_{j,i}$ of the comparator module $B_j$ of the stage 12 may be expressed as $$I_{j,i} = (x_{j,i-1}+1, \ldots, x_{j,i})$$

where $x_{j,i-1}$ is the last output in the interval $I_{j,i-1}$ so that $x_{j,i-1}+1$ is the first output in the interval $I_{j,i}$ and $x_{j,i}$ is the last output in the interval $I_{j,i}$. For example, as shown in FIG. 1, the last output in the interval $I_{1,1}$ of the comparator module $B_1$ of stage 12 is $x_{1,1}$. The first output in the interval $I_{1,2}$ is $x_{1,1}+1$. The last output in the interval $I_{1,2}$ is $x_{1,2}$. Thus, the interval $I_{1,2}$ may be (represented as $$I_{1,2} = \{x_{1,1}+1, \ldots, x_{1,2}\}).$$

The third stage 16 of the merging network 10 of FIG. 1 comprises a plurality of inputs 29 and a plurality of outputs 30. Each input 29 of the stage 16 is connected to a corresponding output 28 of the stage 14. Each output 30 of the stage 16 is connected to (or forms) a corresponding one of the network outputs 32. The connection pattern between the outputs 28 of the stage 14 and the inputs 29 of the stage 16 and between the outputs 30 of the stage 16 and network outputs 32 is known as a horizontal connection pattern (because the rows are horizontal).

Each row in the horizontal connection pattern is given an index z, $z = 1,2, \ldots$. The last output of each comparator module $C_i$ in the stage 14 belongs to the row $z = y_i$. For example, the last output of the comparator $C_1$ has the index $y_1$ and the last output of the comparator $C_k$ has the index $y_k$.

The stage 16 comprises k-1 comparator modules $D_i$, $i = 1,2,3, \ldots, k-1$. Each module $D_i$ has a set of inputs 34 and a set of outputs 36. Each input 34 is formed by one of the inputs 29 to the third stage 16. Each output 36 is formed by one of the outputs 30 of the third stage 16. The last input of each comparator module $D_i$ belongs to the row $z = z_i$. For example, the last input of the comparator module $D_1$ has the index $z = z_1$ and the last input of the comparator module $D_{k-1}$ has the index $z = z_{k-1}$. The index $z = z_0$ represents the connection row which comes before the row containing the first input to the comparator module $D_1$.

To construct an actual merging network in accordance with the architecture of FIG. 1, the index values $x_{j,i}$ (i.e. the last output of each interval $I_{j,i}$ associated with the comparator module $B_j$ of stage 12), $y_i$ (i.e. the last output of each comparator module $C_i$ of the stage 14) and $z_i$ (i.e. the last output of each comparator module $D_i$ of stage 16) are determined. The index values provide the information that is necessary to construct a network of the type illustrated in FIG. 1. In particular, the index values may be used to determine the size and location of the various comparator modules $B_j$, $C_i$, $D_i$ in the network. These index values are determined such that the set of numbers $d(1), d(2), \ldots$ appearing at the network outputs 32 form a single sorted list. In a preferred embodiment of the invention, the index values $x_{j,i}$, $y_i$ and $z_i$ obey the equations $$z_{i-1} - m(j-1) + (m-1)(s-1) \leq sx_{j,i} \leq z_i - m(j-1) + (s-1) \tag{1}$$

$$z_{i-1} \leq y_i \leq z_i, \tag{2}$$

for $i = 1, \ldots, k-1$, and $j = 1,2, \ldots, s$.

Equations (1) and (2) imply that $$b_j(x_{j,i}) \leq d(z_i) \text{ and that } b_j(x_{i,j}+1) \geq d(z_{i-1}+1)$$

The condition $z_{i-1} \leq y_i \leq z_i$ implies that any input of the comparator $D_i$ in the stage 16 is connected to an output of the comparator $C_i$ or $C_{i+1}$ in the stage 14.

The size (i.e. the number of inputs and outputs) $n_j$ of a comparator module $B_j$ in the first stage 12 is given by $$n_j = p_1 + \ldots + p_m + \mu(q_1 - j) + \ldots + \mu(q_m - j), \tag{3}$$

where $p_l = r_l/s$ and $q_l = r_l - sp_l$ for $l = 1, \ldots, m$, m being the number of lists being merged by the merging network 10 of FIG. 1. The notation $[x]$ indicates the integer part of x and the step function $\mu(x) = 0$ if $x < 0$ and $\mu(x) = 1$ otherwise.

The following inequalities are consequences of the equations (1) and (2).

(a) The size of a comparator module $D_i$ in the stage 16 is bound by $$z_i - z_{i-1} \geq (m-2)(s-2) \tag{4}$$

(b) The length of an interval $I_{j,i}$ is bounded by $$x_{j,i} - x_{j,i-1} \geq (m-2)(s-1)/s \tag{5}$$

(c) The total number of comparator modules in the stages 12, 14, and 16 is bounded by $$(m-2)(s-1)(k-1) < n \tag{6}$$

where $n = r_1 30 r_2 \ldots r_m = \Sigma n_j$, i.e. the total number of inputs to all the comparator units $B_j$ in the stage 12.

(d) If none of the intervals $I_{j,i}$ are empty for $j = 1,2, \ldots, s$ then the size of the comparator module $C_i$ in the stage 14, i.e., $y_i - y_{i-1}$, is bounded by $$y_i - y_{i-1} \geq (m-2)(s-1) \tag{7}$$

The partition points $x_{i,j}$ for stage 12, $y_i$ for stage 14, and $z_i$ for stage 16 are determined as follows.

One way to minimize the complexity of the network 10 of FIG. 1 is to make the parameter k as large as possible, which means that the comparator modules $C_i$ and $D_i$ of the stages 14 and 16 are as small as possible. This is of course subject to the constraints of equations (4) and (6) above. The choice of parameters m,s, and k is flexible as long as the constraints of equations (4) and (6) are not violated. It is advantageous to make the comparator modules $C_i$ and $D_i$ as small as possible so that their internal complexity is minimized. The comparator modules $C_i$ and $D_i$ are themselves really sorting networks. If these comparator modules are too large, they themselves will have to be formed recursively from a plurality of merging networks.

For $m = s = k$, $r = r_1 = r_2 = \ldots = r_m = ps \geq 2(s-1)^2$ and $n = mr = mps = ps^2$ a "close form" solution of equations (1) and (2) is given by $$x_{j,i} = ip, \qquad (8)$$
$$y_i = ir,$$
$$z_i = ir + z_0, \, i = 1, \ldots, s.$$

with the initial condition $z_0 = \lfloor r/2 \rfloor$.

Figure 2:
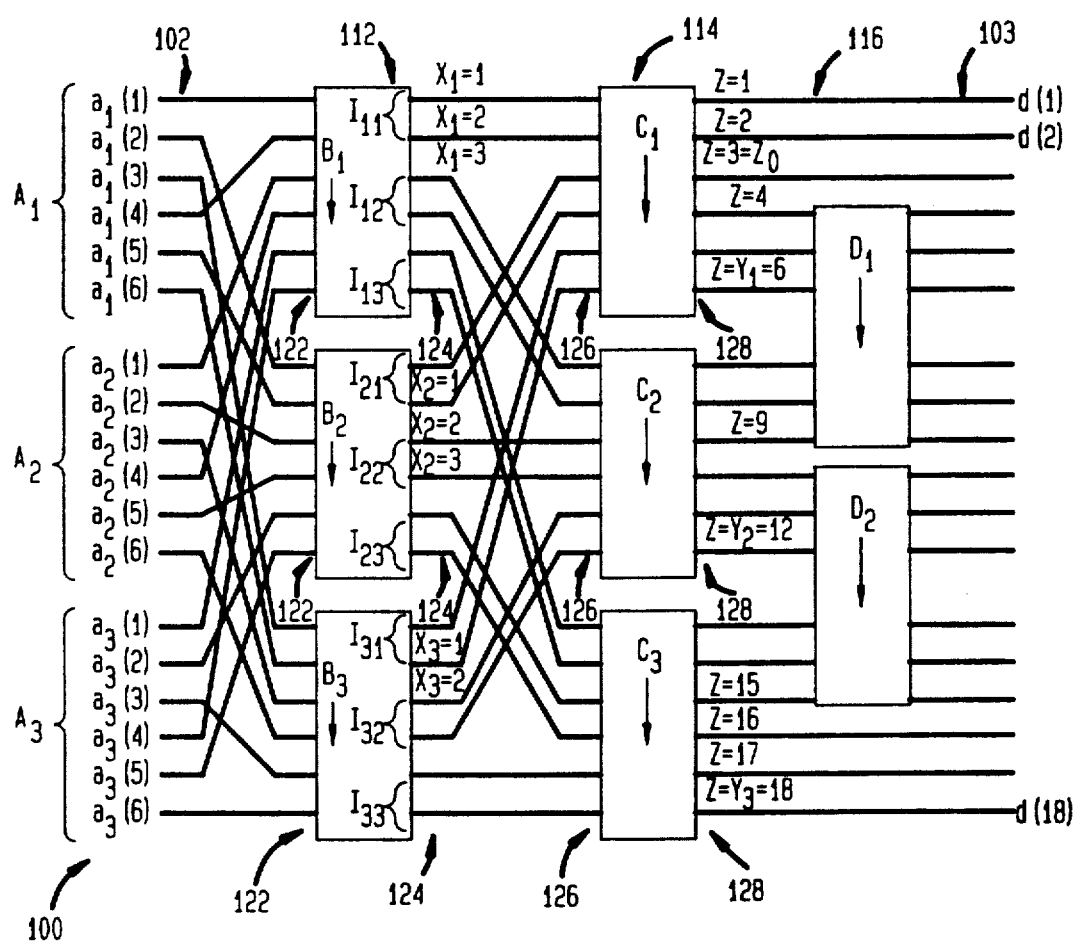
FIG. 2 schematically illustrates an example of the operation of the merging network of FIG. 1.

FIG. 2 illustrates an $18 \times 18$ merging network 100 constructed in accordance with Eq. (8). In the example of FIG. 2, $m = s = k = 3$, $r = r_1 = r_2 = r_3 = ps = 6$, $p = 2$ and $z_0 = \lfloor r/2 \rfloor = 3$. The network 100 has eighteen inputs 102. The network 100 receives $m = 3$ ordered input lists $A_1$, $A_2$, and $A_3$ at the inputs 102. Each input list comprises $r = 6$ numbers. The list $A_1$ is formed by $(a_1(1), \ldots, a_1(6))$. The list $A_2$ is formed by $(a_2(1), \ldots, a_2(6))$. The list $A_3$ is formed by $(a_3(1), \ldots a_3(6))$. The network 100 of FIG. 2 sorts the input lists $A_1$, $A_2$ and $A_3$ into a single sorted output list which is formed from the numbers $d(1), d(2), \ldots, d(18)$ appearing at the network outputs 103.

The network 100 comprises three stages of comparator modules 112, 114, 116. The first stage 112 is formed by the $s = 3$ comparator modules $B_1$, $B_2$, $B_3$. The second stage 114 is formed by $k = 3$ comparator modules $C_1$, $C_2$, $C_3$. The third stage is formed by $k - 1 = 2$ comparator modules D and Dz. The size of each module $B_j$, $j = 1,2,3$ in stage 112 of FIG. 2 is determined in accordance with equation (3). Equation (3) indicates that in the first stage 112, each of the comparator modules $B_1$, $B_2$, $B_3$ has six inputs 122 and six outputs 124. The network inputs 102 are connected to the inputs 122 of the comparator modules $B_1$, $B_2$, $B_3$ of stage 12 using a mod(3) shuffle interconnection pattern. The outputs 124 of each of the comparator modules $B_1$, $B_2$ and $B_3$ of stage 112 are partitioned into intervals $I_{j,i}$. In accordance with equation (8), the end point $x_{j,i}$ of each interval $I_{j,i}$ is given by $x_{j,i} = ip$ where $P = 2$. Thus, the end points of the output intervals of the comparator $B_1$ are $x_{1,1} = 2$, $x_{1,2} = 4$, $x_{1,3} = 6$. The corresponding intervals $I_{1,1}$, $I_{1,2}$ and $I_{1,3}$ are illustrated in FIG. 2. Similarly, the end points of the intervals $I_{2,1}$, $I_{2,2}$ and $I_{2,3}$ associated with the comparator module $B_2$ of FIG. 2 are $x_{2,1} = 2$, $x_{2,2} = 4$ and $x_{2,3} = 6$. The end points of the intervals $I_{3,1}$, $I_{3,2}$, $I_{3,3}$ associated with the comparator module $B_3$ are $x_{3,1} = 2$, $x_{3,2} = 4$, and $x_{3,3} = 6$.

As shown in FIG. 2, each comparator module $C_i$, $i = 1,2,3$ in the stage 114 has the inputs 126 and the outputs 128. In accordance with equation (8), $y_i = ir = i6$ i.e. the index $y_i$ of the last output of $C_1$ equals 6, $y_2$ (the index of the last output of $C_2$) equals 12, and $y_3$ (the index of the last output $C_3$) equals 18. In this manner it is determined that each comparator module $C_i$ in the stage 114 has $y_i - y_{i-1}$ outputs and is therefore a $6 \times 6$ comparator module. In the manner described above, each interval $I_{j,i}$ from the comparator $B_j$, $j = 1,2,3$, of stage 112 is connected to a subset of the inputs of the comparator module $C_i$. For example, the outputs in the intervals $I_{1,1}$, $I_{1,2}$ and $I_{1,3}$ are connected to a subset of the inputs 126 of $C_1$, $C_2$ and $C_3$, respectively.

As shown in FIG. 2, the stage 116 comprises the comparator modules $D_1$ and $D_2$. The initial condition is $z_0 = 3$, so that the first input to the comparator module $D_1$ has the index $z = 4$. The last input $z_i$ of each comparator $D_i$, $i = 1,2$ in stage 116 is given by equation (8) as $z_i = ir + z_0$. Thus $z_1 = 9$ and $z_2 = 15$. In this manner the number of inputs $z_i - z_{i-1}$ of each comparator module $D_i$ is determined to be six. It should be noted that the outputs 128 of the comparator module $C_1$ of the stage 114 corresponding to $z = 1$, $z = 2$, $z = 3$ are connected directly to corresponding network outputs 103. Similarly, the outputs 128 of the comparator module $C_3$ of the stage 114 corresponding to $z = 16$, $z = 17$, and $z = 18$ are connected directly to corresponding network outputs 103.

Unfortunately, the requirements on the parameters m,s,k and r in equation (8) are too stringent for the recursive construction of a sorting network. Also the solution of equations (1) and (2) set forth in equation (8) is not the most optimal solution. A more optimal solution for determining the partition points $x_{j,i}$, $y_i$, and $z_i$ for the modules $B_j$, $C_i$, and $D_i$ of stages 12, 14, and 16 of FIG. 1 may be obtained using the following iterative algorithm.

1. input m, s, n and $n_j$, $j = 1, \ldots, s$
2. set $z_0 = 1$, $i = 1$
3. set $e = 0$
4. set $y_i = 0$
   do $j = 1$ to $s$ $$x_{j,i} = \left\lfloor \frac{1}{s} [z_{i-1} - m(j-1)(s-1) + e] \right\rfloor + 1$$

if $x_{j,i} < 0$ then $x_{j,i} = 0$
   if $x_{j,i} > n_j$ then $x_{j,i} = n_j$
   $y_i = y_i + x_{j,i}$
   end do
5. if $y_i < z_{i-1}$ then $e = e + 1$ and goto step 4
6. set $z_i = 0$
   do $j = 1$ to $s$
   $a = sx_{j,i} + m(j-1) - (s-1)$
   if $z_i < a$ then $z_i = a$
   end do
7. if $z_i \geq n$ then goto step 9
8. set $i = i + 1$ and goto step 3
9. set $k = i$, $x_{j,k} = n_j$, $y_k = n$
10. output $x_{j,i}$, $y_i$, $z_{i-1}$, $i = 1, \ldots, k$; $j = 1, \ldots, s$ Depending on the value of the initial condition $z_0$ there may be up to s different solutions which are obtained by this algorithm.

Figure 3:
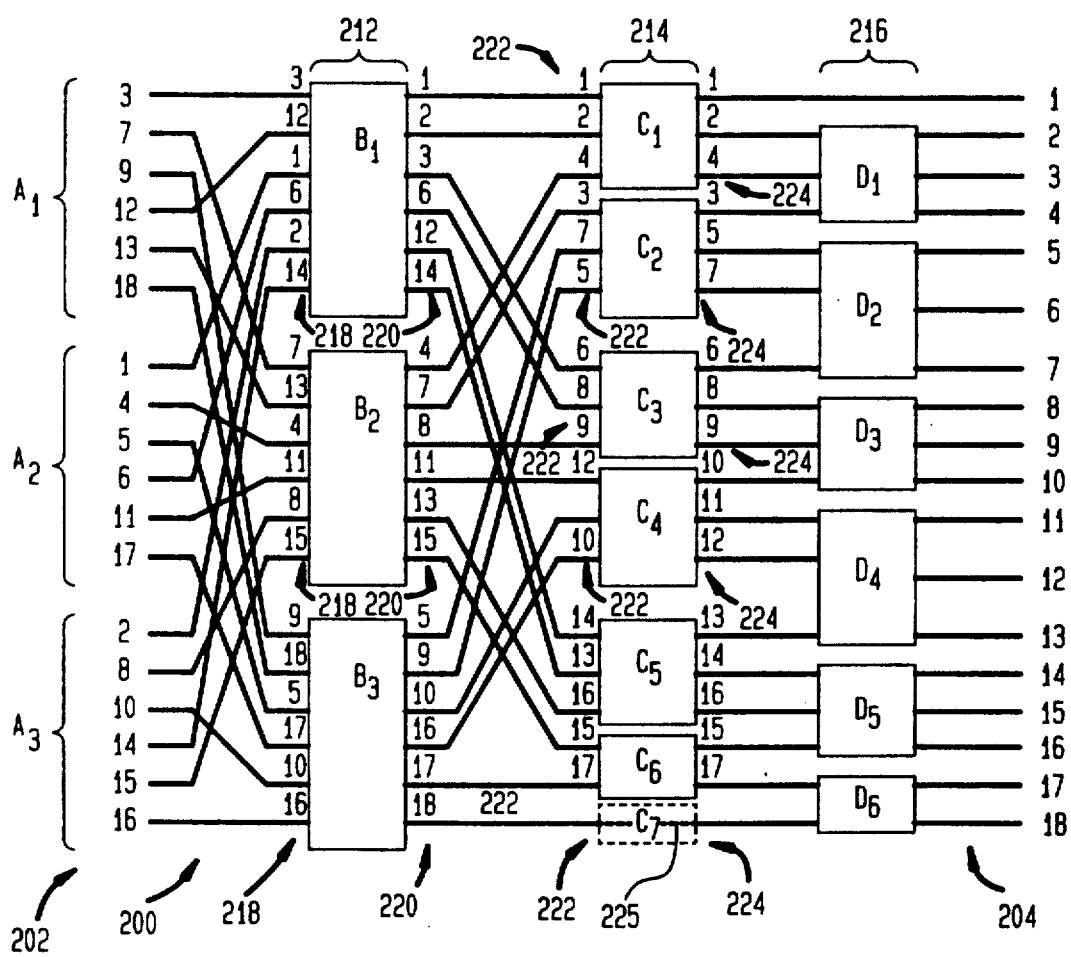
FIG. 3 schematically illustrates a further example of the operation of the merging network of FIG. 1.

FIG. 3 illustrates an $18 \times 18$ merging network 200 constructed in accordance with the iterative algorithm prescribed above. The $18 \times 18$ merging network 200 of FIG. 3 is more optimal than the $18 \times 18$ merging network 100 of FIG. 2.

The merging network 200 of FIG. 3, receives three lists $A_1$, $A_2$ and $A_3$ at its inputs 202 and outputs a single ordered list at the outputs 204. The network 200 comprises there stages 212, 214, 216.

The stage 212 comprise the comparator modules $B_1$, $B_2$, and $B_3$. Each of the comparator modules in the stage 212 has six inputs 218 and six outputs 220. The network inputs 202 are connected to the inputs 218 using a mod(3) shuffle interconnection pattern. The outputs 220 are divided into intervals $I_{j,i}$ in the manner described above.

The stage 214 comprises seven comparator modules $C_1, \ldots, C_7$. Each comparator module $C_1, \ldots, C_7$ has one or more inputs 222 and one or more outputs 224. In the manner indicated above, the outputs in the interval $I_{j,i}$ of the comparator module $B_j$ of stage 212 are connected to a subset of the inputs 222 of the comparator module $C_i$ of stage 214. It should be noted that in FIG. 2, the intermediate stage 114 comprises three $6 \times 6$ comparator modules. In contrast in FIG. 3, the intermediate stage 214 comprises seven comparator modules none of which is larger than $3 \times 3$. This is more optimal because the $3 \times 3$ comparator modules are of simpler internal construction. In FIG. 3, the comparator module $C_7$ is shown in phantom. The reason is that $C_7$ is a one-by-one comparator module which may be replaced by the wire 225.

The stage 216 comprises six comparator modules $D_1, \ldots, D_6$ none of which is larger than three-by-three. There is more optimal than the $6 \times 6$ comparator modules utilized in the stage 116 of the network 100 of FIG. 2.

In short, a merging network which can merge three or more ordered input lists into a single output list has been disclosed.

Finally, the above-described embodiments of the invention are intended to be illustrative only. Numerous alternative embodiments may be devised by those skilled in the art without departing from the spirit and scope of the following claims.

I claim:

1. A merging network comprising
    a set of network inputs for receiving m, m > 2, input lists of sorted numbers,
    a set of network output for outputting a single list of sorted numbers formed from said input lists,
    a first stage comprising s comparator modules $B_j$, j = 1,2,3, ..., s, each having one or more inputs and one or more outputs, said network inputs being connected to said inputs of said comparator modules $B_j$, of said first stage utilizing mod(s) shuffle interconnection pattern, the outputs of each of said comparator modules $B_j$, in said first stage being partitioned into k intervals, each of which intervals includes a subset of the outputs of the corresponding comparator module $B_j$,
    a second stage comprising k comparator modules $C_i$, i = 1,2, ..., k, each having one or more inputs and one or more outputs, the $i^{th}$, interval of outputs of each of the comparator modules $B_j$, of the first stage being connected to a subset of the inputs of the comparator module $C_i$, of the second stage, and
    a third stage comprising a plurality of inputs and a plurality of outputs, each of said inputs being directly connected to a corresponding output of one of said comparator modules of said second stage and said outputs forming said network outputs, said third stage comprising k − 1 comparator modules $D_i$, i = 1,2, ..., k − 1, each of said comparator modules $D_i$ having one or more inputs formed by a subset of said inputs of said third stage and one or more outputs formed by a subset of said outputs of said third stage, each of said inputs of each comparator module $D_i$ in said third stage being connected to an output of said comparator module $C_i$, or $C_{i+1}$ of said second stage.

2. The merging network of claim 1 wherein a subset of said inputs to said third stage are connected directly to corresponding ones of said outputs of said third stage.

3. The merging network of claim 1 wherein an output of a comparator module in said first stage is connected directly to an input of said third stage.

4. The merging network of claim 1 wherein each comparator module $D_i$ in said third stage has $Q_i$ inputs and $Q_i$ outputs, where $Q_i \geq (m-2)(s-1)$.

5. The merging network of claim 1 wherein each interval of outputs of each comparator module $B_j$ in said first stage includes at least $(m-2)(s-1)/s$ outputs.

6. The merging network of claim 1 wherein the total number of comparator modules in said first, second and third stages is less than $(m-2)(s-1)(k-1)$.

7. The merging network of claim 1 wherein each comparator module $C_i$ in said second stage has $P_i$ inputs and $P_i$ outputs, where $P_i \geq (m-2)(s-1)$.

8. The merging network of claim i wherein a largest number outputted in the $i^{th}$ interval of outputs of the comparator module $B_j$ of said first stage is less than or equal to a largest number received by the comparator module $D_i$ in the third stage.

9. The merging network of claim 8 wherein a smallest number outputted in the $(i+1)^{th}$ interval of outputs of the comparator module $B_j$ of the first stage is greater than or equal to the smallest number received by the comparator module $D_{i+1}$ of the third stage.

10. The merging network of claim 1 wherein each of said first, second, and third stages comprises at least one comparator module having more than two inputs and more than two outputs.

* * * * *